(12) United States Patent
Burckart et al.

(10) Patent No.: US 8,850,054 B2
(45) Date of Patent: Sep. 30, 2014

(54) HYPERTEXT TRANSFER PROTOCOL LIVE STREAMING

(75) Inventors: Erik J. Burckart, Raleigh, NC (US); Gennaro A. Cuomo, Cary, NC (US); Dinakaran Joseph, Apex, NC (US); Victor S. Moore, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 13/352,154

(22) Filed: Jan. 17, 2012

(65) Prior Publication Data
US 2013/0185452 A1 Jul. 18, 2013

(51) Int. Cl.
*G06F 15/16* (2006.01)
*H04L 29/06* (2006.01)

(52) U.S. Cl.
CPC ................ *G06F 15/16* (2013.01); *H04L 29/06* (2013.01); *H04L 29/06027* (2013.01)
USPC ....................................................... 709/231

(58) Field of Classification Search
CPC .... G06F 15/16; H04L 29/06; H04L 29/06027
See application file for complete search history.

(56) References Cited

U.S. PATENT DOCUMENTS

| | | | |
|---|---|---|---|
| 6,678,332 B1 * | 1/2004 | Gardere et al. | 375/240.26 |
| 6,760,916 B2 * | 7/2004 | Holtz et al. | 725/34 |
| 6,990,151 B2 * | 1/2006 | Kim et al. | 375/240.27 |
| 7,418,470 B2 * | 8/2008 | Howard et al. | 709/201 |
| 8,515,123 B2 * | 8/2013 | Thorwirth | 382/100 |
| 2002/0133491 A1 * | 9/2002 | Sim et al. | 707/10 |
| 2004/0202073 A1 * | 10/2004 | Lai et al. | 369/47.33 |
| 2005/0066063 A1 * | 3/2005 | Grigorovitch et al. | 710/1 |
| 2005/0165849 A1 | 7/2005 | Moradi et al. | |
| 2006/0020881 A1 * | 1/2006 | Szabo et al. | 715/501.1 |
| 2007/0174474 A1 * | 7/2007 | Zhong et al. | 709/230 |
| 2007/0204003 A1 * | 8/2007 | Abramson | 709/217 |
| 2007/0288715 A1 * | 12/2007 | Boswell et al. | 711/164 |
| 2008/0040498 A1 * | 2/2008 | Setlur et al. | 709/231 |
| 2008/0066185 A1 * | 3/2008 | Lester et al. | 726/27 |
| 2009/0089398 A1 * | 4/2009 | Lambert | 709/217 |
| 2009/0112839 A1 * | 4/2009 | Fisher et al. | 707/5 |
| 2009/0198358 A1 * | 8/2009 | Logan et al. | 700/94 |

(Continued)

FOREIGN PATENT DOCUMENTS

WO WO2011068784 A1 6/2011

OTHER PUBLICATIONS

Pang et al., "A First Look at Modern Enterprise Traffic", 2005.*

(Continued)

*Primary Examiner* — Ondrej Vostal
(74) *Attorney, Agent, or Firm* — Yee & Associates, P.C.; David A. Mims, Jr.

(57) ABSTRACT

Illustrative embodiments disclose receiving a command to play a selected audio visual media on a client device. The client device determines portions of audio visual media from elected audio visual media and a sequence identifying each portion of the portions in a particular order for playing the portions. The portions and the sequence are determined according to a policy for playing each portion on the client device. The client device retrieves the portions to play in sequence and plays at least a partially retrieved first portion of the portions of the selected audio visual media on the client device. The first portion is identified based on the particular order in the sequence.

19 Claims, 8 Drawing Sheets

(56) References Cited

U.S. PATENT DOCUMENTS

| | | | |
|---|---|---|---|
| 2010/0026886 A1* | 2/2010 | Sharlet et al. | 348/441 |
| 2010/0094961 A1* | 4/2010 | Zuckerman et al. | 709/219 |
| 2010/0220592 A1 | 9/2010 | Pan et al. | |
| 2011/0096246 A1* | 4/2011 | Dunn et al. | 348/739 |
| 2011/0096828 A1 | 4/2011 | Chen et al. | |
| 2011/0154213 A1* | 6/2011 | Wheatley et al. | 715/738 |
| 2011/0231519 A1* | 9/2011 | Luby et al. | 709/219 |
| 2011/0231569 A1* | 9/2011 | Luby et al. | 709/234 |
| 2011/0292280 A1* | 12/2011 | Sloo | 348/465 |
| 2012/0042089 A1* | 2/2012 | Chen et al. | 709/231 |
| 2012/0042090 A1* | 2/2012 | Chen et al. | 709/231 |
| 2012/0221681 A1* | 8/2012 | Yuan et al. | 709/217 |
| 2013/0073534 A1* | 3/2013 | French | 707/706 |
| 2013/0110921 A1* | 5/2013 | Logan et al. | 709/204 |

OTHER PUBLICATIONS

Timmerer et al., "Dynamic Adaptive Streaming over HTTP: From Content Creation to Consumption", 2012.*

Gregorio et al., "The Atom Publishing Protocol", RFC 5023, 2007.*

Sanchez et al., "Efficient HTTP-based streaming using Scalable Video Coding", 2011.*

Oyman et al., "Quality of Experience for HTTP Adaptive Streaming Services", 2012.*

Arlitt et al., "A Workload Characterization Study of the 1998 World Cup Web Site", 2000.*

Stockhammer, "Dynamic Streaming over HTTP—Design Principles and Standards", 2011.*

Fielding et al, "Hypertext Transfer Protocol—HTTP/1.1", RFC 2616, 1999.*

Schulzrinne et al., "Real Time Streaming Protocol (RTSP)", RFC 2326, 1998.*

Berners-Lee et al., "Hypertext Transfer Protocol—HTTP/1.0", RFC 1945, 1996.*

* cited by examiner

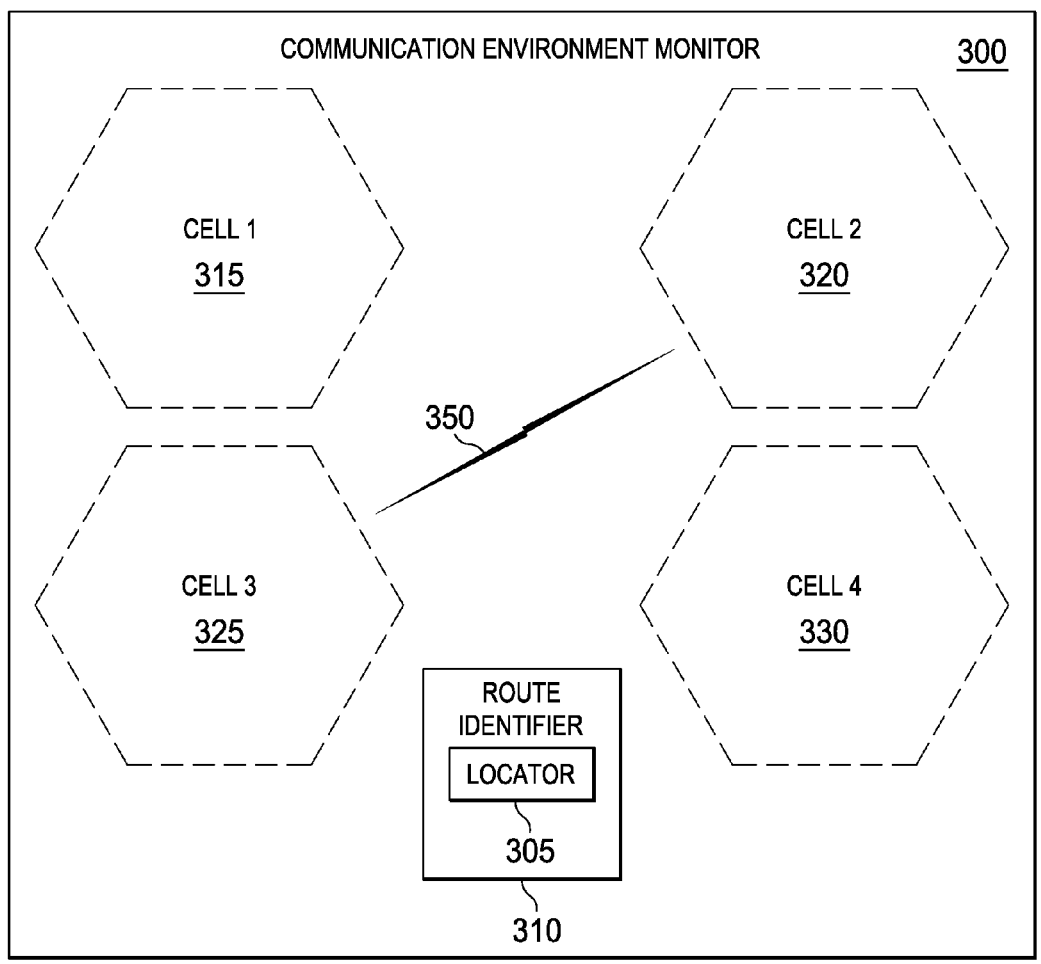

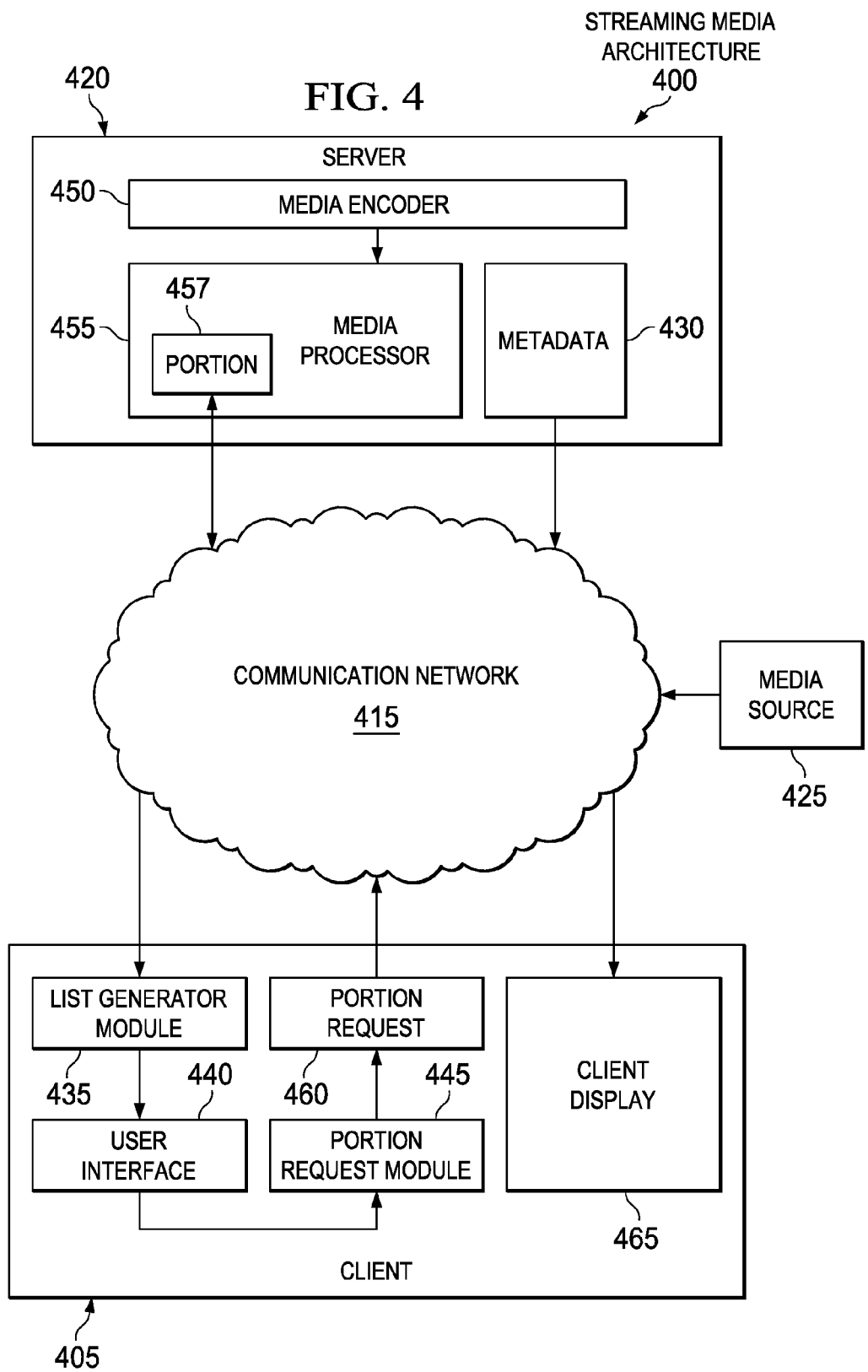

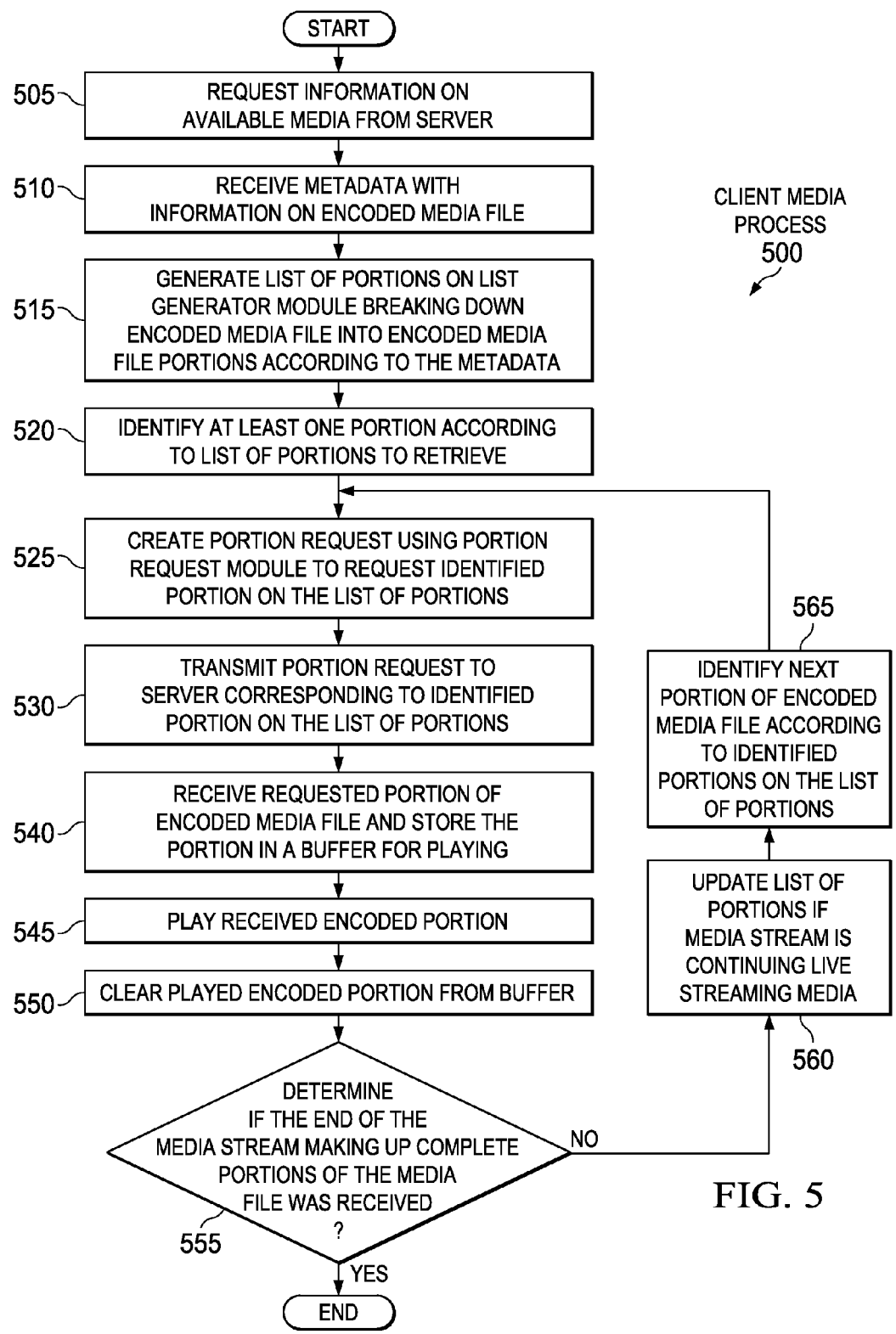

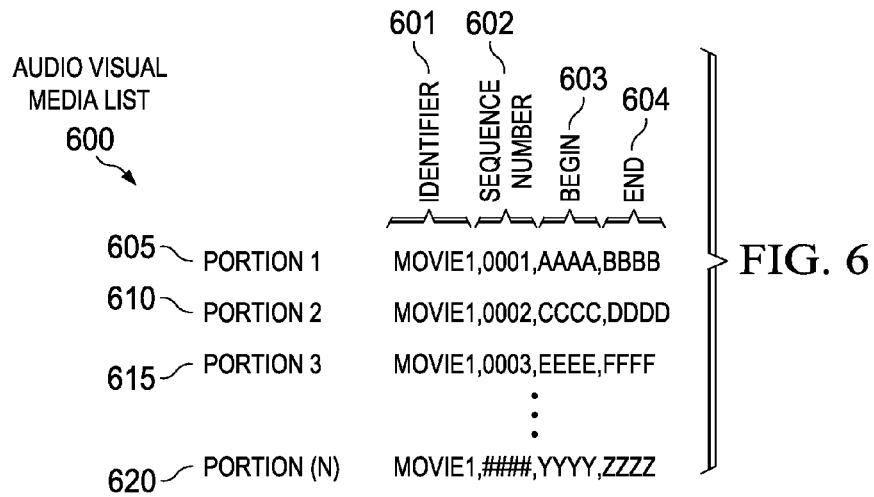
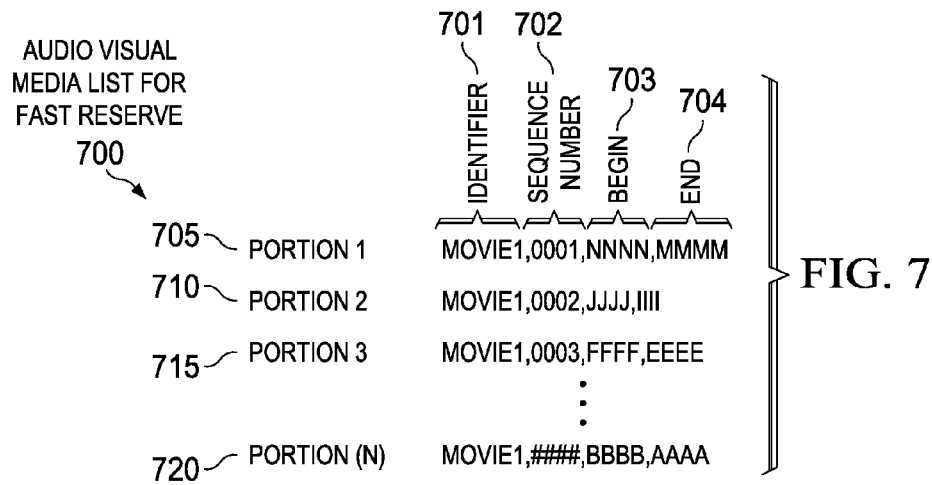
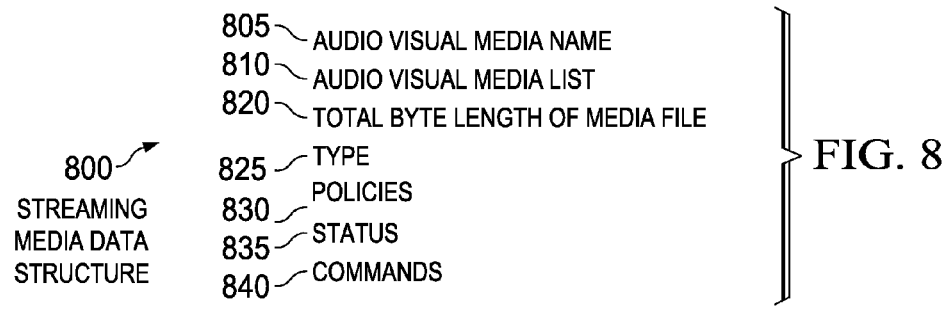

HYPERTEXT TRANSFER PROTOCOL LIVE STREAMING

BACKGROUND

1. Field

The disclosure relates generally to an improved data processing system, and in particular, to streaming media. Still more particularly, the present disclosure relates to a method and apparatus for streaming media on client computer systems.

2. Description of the Related Art

In a progressive Hypertext Transfer Protocol (HTTP) download for a media file, an HTTP server first transmits information for the file followed by the media file data itself. A client stores the data in a file as the file is received, just like any other download. A media player knows how to play the stored media from the transmitted file data.

Progressive downloading is being currently replaced by Hypertext Transfer Protocol Live Streaming (HTTP-LS). In Hypertext Transfer Protocol Live Streaming, a media file is duplicated as a partitioned file divided into equal chunks stored in a separate file. To play a media file, a client device first retrieves a list of the stored chunks making up the media itself. The client player then retrieves the chunks. Pre-partitioning the media file into chunks creates a considerable burden for the server as it partitions the file into chunks and stores the chunks in a memory location, and the server must maintain both a partitioned and un-partitioned copy in memory.

Servers, such as server computer systems and server software systems that can hold state for client and server communication sessions are more expensive than servers that are stateless. Stateless servers can be more easily distributed allowing for better performance and lower costs. Thus, client and server media download sessions that use state in a server to manage the client and server media download sessions require more server processing power that is desired. Further, a client device may be used to identify information for the client device that the server does not have. This information may include a location of the client device and a client device user's orders or commands. It may be expensive to send this information from the client device to the server device. Also, the server would have to have even more state in order to remember this additional client information.

Client devices that are mobile have performance and technical issues when attempting to download large amounts of data needed to retrieve audio video media. For example, it may be impossible for mobile clients to download an entire file through one cell tower or even through one cell phone provider. Also, the server and the network used to transfer the file from the server to the client device may have problems causing a failure or unacceptable delay in transfer of the file to the client device.

Therefore, it would be advantageous to have a method and apparatus that takes into account at least some of the issues discussed above, as well as possibly other issues.

SUMMARY

Illustrative embodiments disclose receiving a command to play a selected audio visual media on a client device. The client device determines portions of audio visual media from elected audio visual media and a sequence identifying each portion of the portions in a particular order for playing the portions. The portions and the sequence are determined according to a policy for playing each portion on the client device. The client device retrieves the portions to play in sequence and plays at least a partially retrieved first portion of the portions of the selected audio visual media on the client device. The first portion is identified based on the particular order in the sequence.

BRIEF DESCRIPTION OF THE SEVERAL VIEWS OF THE DRAWINGS

FIG. 3 is an illustrative diagram of a communication environment monitor in accordance with an illustrative embodiment.

FIG. 4 is an illustration of a streaming media system in accordance with an illustrative embodiment.

FIG. 5 is an illustration of a flow chart for a client media process in accordance with an illustrative embodiment.

FIG. 6 is an illustration of an audio visual media list generated by a client in accordance with an illustrative embodiment.

FIG. 7 is an illustration of an audio visual media list for fast reverse generated by a client in accordance with an illustrative embodiment.

FIG. 8 is an illustration of a streaming media data structure in accordance with an illustrative embodiment.

DETAILED DESCRIPTION

Figure 1:
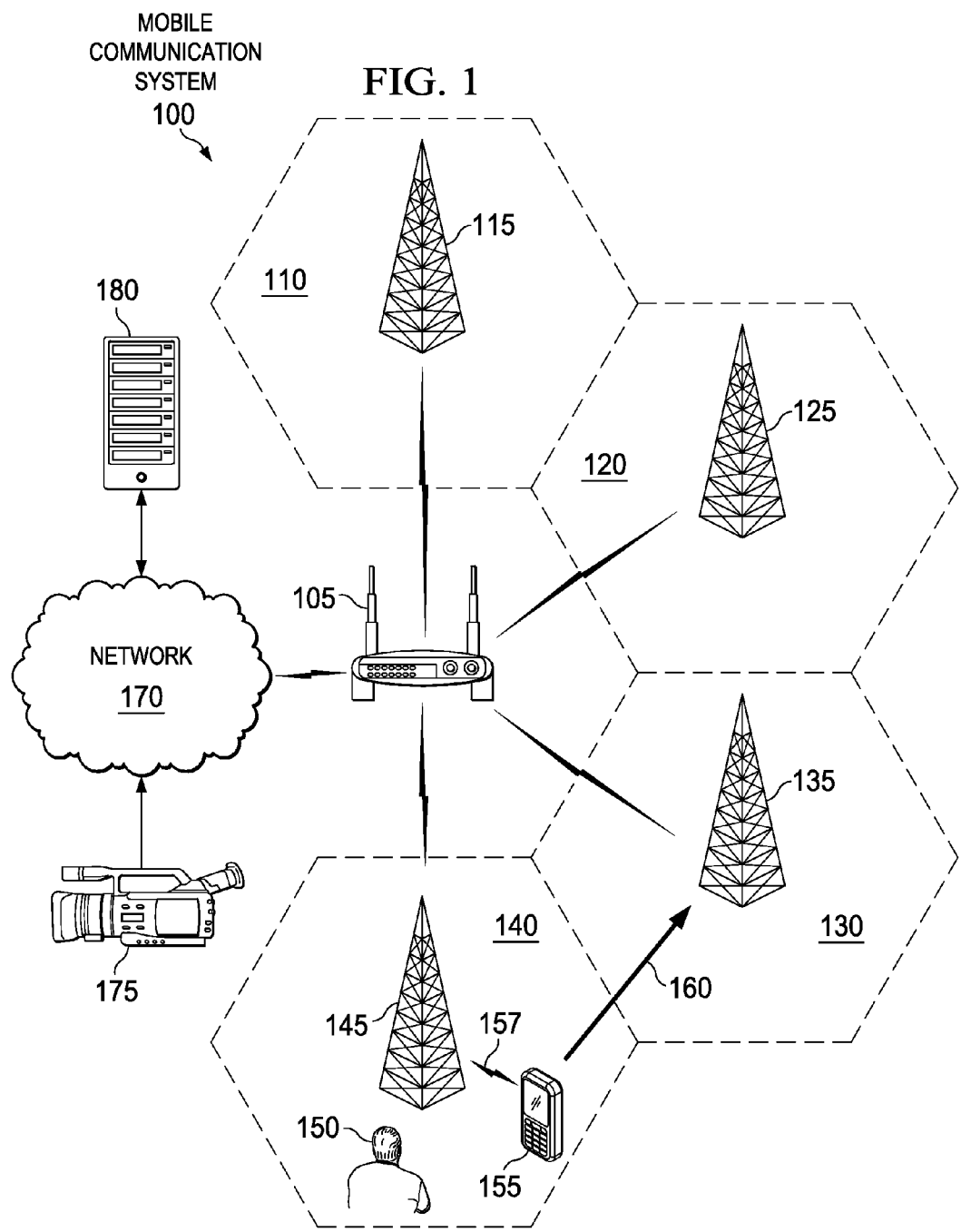
FIG. 1 is an illustration of a block diagram of a basic mobile communication system in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to FIG. 1, an illustration of a basic mobile communication system is depicted in accordance with an illustrative embodiment. It should be appreciated that FIG. 1 is only provided as an illustration of one implementation and is not intended to imply any limitation with regard to the system in which different embodiments may be implemented. Many modifications to the depicted system may be made.

As depicted, mobile communication system 100 depends on router 105 to route messages to their intended addresses. Cell site 110 communicates with user devices in its coverage area using transceiver 115. Cell site 120 communicates with user devices in its coverage area using transceiver 125. Cell site 130 communicates with user devices in its coverage area using transceiver 135. Cell site 140 communicates with user devices in its coverage area using transceiver 145. In these illustrative examples, user 150 uses a user device comprising mobile communication device 155, such as, for example, a mobile client device, with wireless link 157 to communicate with transceiver 145. As depicted, movement vector 160 depicts movement of user 150 and communication device 155 from cell site 140 to cell site 130. In these illustrative examples, as user 150 and communication device 155 moves from cell site 140 to cell site 130, communications using wireless link 157 must be switched, or a hand off performed, from transceiver 145 to 135. This involves updating location data and routing information on the communication device 155 and intervening routers, such as router 105, and any other communication node involved with communicating with communication device 155, so that router 105 or other nodes correctly delivers message packets or generates correctly addressed message packets to mobile communication device 155 using a subsequent wireless link (not shown). Hand off can also require registration and authentication on the new cell site. Often, message packets can be dropped and data lost during hand off.

In these illustrative examples, each transceiver 115, 125, 135, and 145 can be associated with a different server managing communications on the respective cell sites 110, 120, 130, and 140. As depicted, router 105 routes communications between communication network 170, cell site 110, cell site 120, cell site 130, and cell site 140. Communication network 170 facilitates communication from media devices such as camera device 175 to media server 180. In these illustrative examples, media server 180 receives media, such as live streaming video from camera device 175, and processes and stores the data for distribution, which is then transmitted to the user 150 on communication device 155. Media server 180 can also store media in files for transmission to communication device 155 upon request by user 150.

As used herein, "client device" or "client" refers to any device configured to play media data, such as streaming multimedia. A client may be, for example, a computer, a laptop computer, a mobile phone, a set top box, a gaming console, a tablet computer, and other suitable types of communication devices. "Server" as used herein, generally refers to any device, more specifically, a hardware computer server used to manage network resources, including media database, file storage, distribution, and communication. However, more generally, server can refer to a computer program running to serve the needs or requests of other programs running on the same or different computer, a physical computer dedicated to serve the needs of programs running on other computers on the same network, or a combination of a software and hardware system running on a dedicated computer or distributed among a plurality of computers. There are many possible types of servers dependant on the task the servers is configured to perform.

As used herein, "media" is defined as audio, visual/video, or a combination of the two, data transmitted over a computer system to communicate information. "Multimedia" is sometimes defined in the art as the use of computers to present text, graphics, audio, video, and animation in an integrated way. "Media" as used herein, generically includes multimedia and includes, for example, generated game animation, recorded sound, recorded movies, and recorded television programming, live concerts, live sporting events, live news broadcast, or other live, recorded, or generated audio video data. Thus, media includes any type of audio data, video data, audio video data, picture data, and this media data may also include streamed data, such as live media being streamed from a media device to a computer system for further routing to user devices, such as clients, which are receiving data for playback on the user devices, recorded media streamed from a media server or other data storage device to a computer system for further routing to user devices for playback, or generated media such as game animation video and audio data streamed from a server or other computer device to a computer system for further routing to user devices for use or playback.

Figure 2:
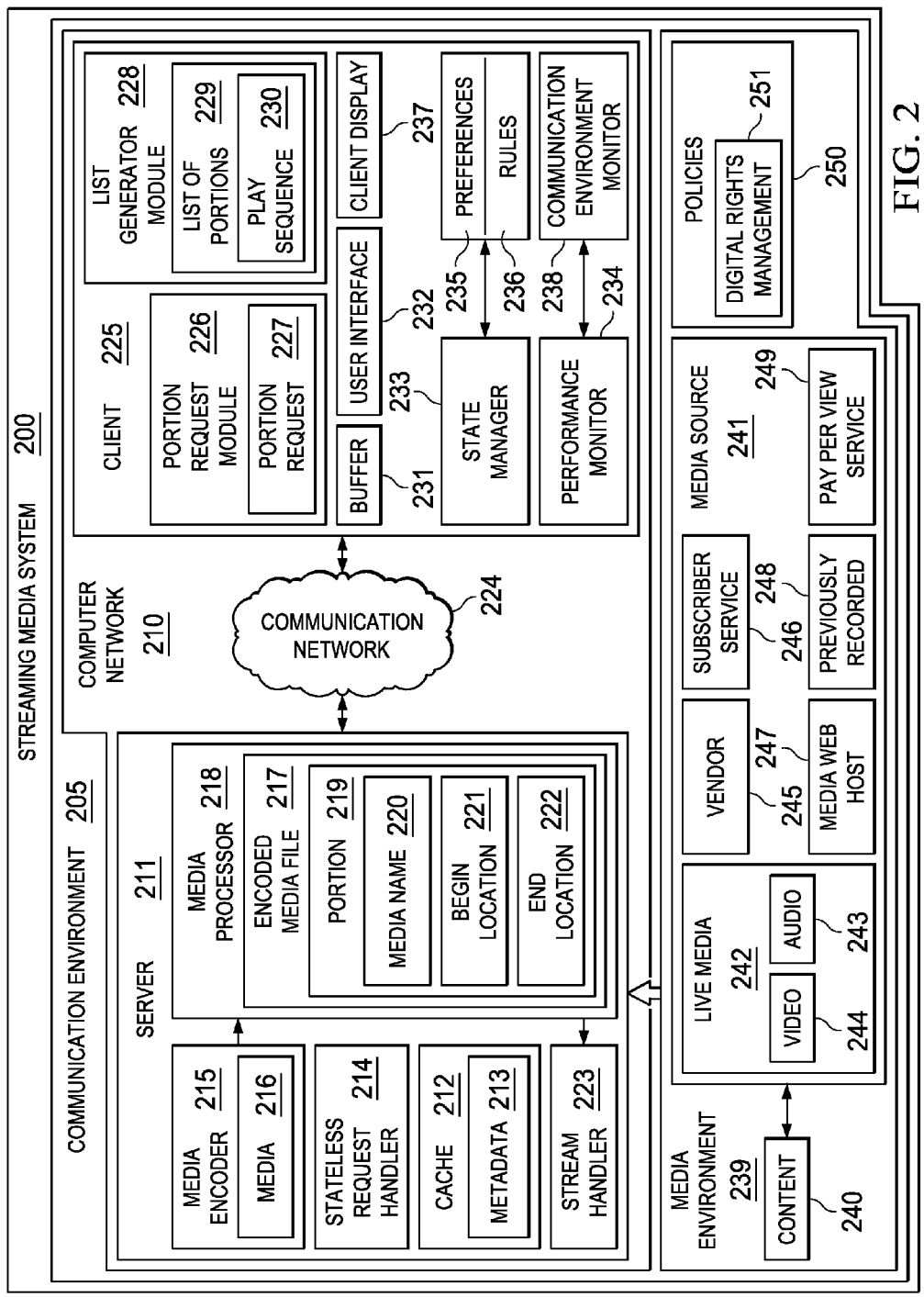
FIG. 2 is an illustrative block diagram of a streaming media system in accordance with an illustrative embodiment.

FIG. 2 depicts an illustrative block diagram of a streaming media system in accordance with an illustrative embodiment. It should be appreciated that FIG. 2 is only provided as an illustration of one implementation and is not intended to imply any limitation with regard to the architecture in which different embodiments may be implemented. Many modifications to the depicted architecture may be made. As depicted, streaming media architecture 200 includes communication environment 205. Computer network 210 includes server 211. Server 211 can comprise a network computer server configured to support distributing streaming audio visual media such as a hypertext transport protocol server or hypertext transport protocol live streaming server. Server 211 may be implemented using software, hardware, or a combination of the two.

In these illustrative examples, server 211 configuration can include cache 212 storing metadata 213 for media available from server 211. Metadata 213 can comprise, for example, live media indicator, name for the media, memory locations storing parts of media, policy data such as digital rights management information that can limit use of media or set rules 236, duration of access to media, frame width, frame height, frame rate video was recorded with, and encoding standard.

In these illustrative examples, server 211 does not store state information for each request. In these illustrative examples, server 211 responds to each request individually. For example, a first request is processed from server 211 as an independent request unrelated to any previous request. In these illustrative examples, a stateless protocol used for communications with server 211 does not require server 211 to store session or status information regarding the communications. For example, each communication with server 211 may consist of independent pairs of requests and responses. As depicted, stateless request handler 214 handles the request for a portion of media 216.

In these illustrative examples, media encoder 215 can processes media 216 to produce media in a desired format for transmission and storage on the server. For example, media encoder 215 may retrieve media 216 for converting media 216 into the desired format for transmission to particular client devices. The conversion may also include compressing media 216. In these illustrative examples, media encoder 215 encodes media 216. For example, media encoder may generate encoded media, such as encoded media file 217, in a desired encoding. Current video media encoding standards, for example, include the Moving Picture Experts Group (MPEG) encoding standards. These encoding standards include encoding and compression of audio visual data for streaming media over networks and distribution on physical media, for voice communications on a telephone or videophone, for broadcast television applications, and for other media applications.

As depicted, media encoder 215 may also implement a codec for converting media 216 into a particular encoding for transmission and storage in the form of encoded media. The codec can further be used to emphasize and better resolve motion, color, surface texture, and sound. Media processor 218 processes encoded media, such as encoded media file 217 generated by the media encoder 215 in response to a request to transmit portion 219. In these illustrative examples, media processor 218 can comprise a program module or sub-program, such as a Java applet and/or servlet running on server 211.

In these illustrative examples, media processor 218 can also comprise a software module operating on the server 211 and any other combination of software and/or hardware on server 211 that is configured to generate portion 219. As depicted, portion 219 has media name 220, begin location 221, and end location 222. In these illustrative examples, media name 220 is an identifier for media file 217 for a portion of media file 217. Begin location 221 and end location 222 represent a first location and a second location that determine the start of the portion and the end of the portion in media file 217 in these illustrative examples.

In these illustrative examples, stream handler 223 manages streaming portion 219 of encoded media file 217 over communication network 224 to client 225 from server 211. The depiction of server 211 is not meant to limit where the components of server 211 may be implemented. In other illustrative examples, the components of server 211 may be distributed and located on other servers. For example, stream handler 223 can be distributed among multiple servers such as server 211 in computer network 219 along with stateless request handler 214. Because stateless request handler 214 operates stateless, client device requests may easily be distributed among a plurality of servers without a requirement to synchronize state for client device requests, thus improving server response time to handle each client device request.

In these illustrative examples, client 225 includes portion request module 226 for generating portion request 227 for portion 219. List generator module 228 generates list of portions 229. As depicted, play sequence 230 sets forth the order for playing each portion, such as portion 219, of the list of portions 229. In these illustrative examples, portion request module may use buffer 231 and other storage to store portions such as portion 219 for later use.

In these illustrative examples, play sequence 230 can be used by client 225 to control the location used in buffer 231 for each portion stored in buffer 231. For example, client 225 may use play sequence 230 to store each portion in the order for playing each portion. Also, as depicted, client 225 may store the portions in buffer 231 in the order received and then use play sequence 230 to retrieve the portions in the order for playing each portion. In these illustrative examples, client 225 uses user interface 232 to input commands to client 225. For example, a user may enter a command to play media 216 into user interface 232.

In these illustrative examples, state manager 233 in client 225 stores state information to facilitate transmitting media 216 and support downloading and streaming of encoded media file 217 from server 211. In these illustrative examples, client 225 is "statefull" keeping track of the state of interactions between client 225 and server 211 with values set in a storage field maintained by state manager 233. Sever 211 can comprise a hardware, software, or a combination of both hardware and software. Commonly, server 211 comprises a dedicated computer configured as a media server for providing media services over a communication network to store and distribute encoded media 217.

State information maintained by client 225 by the state manager 233 can include communication session information such as, for example, application layer data, session layer data, transport layer data, authentication data, server management data, configuration settings data, transaction data, or any other data for the next session. For example, application layer data can include the protocol and method used in an Internet Protocol (IP) network communication, session layer information can include requests and responses between applications that occur in the background, and transport layer information can include connection-oriented data stream support, reliability, flow control, and multiplexing data. In these illustrative examples, state manager 233 stores and manages the state information required for communication between client 225 and server 211, while server 211, and any other server supporting the communication, remains stateless.

In these illustrative examples, server 211 lacks "state" and thus comprises a "stateless" server. Each interaction between server 211 and client 225 occurs independently without knowledge or reference to any earlier transaction by server 211. Server 211 comprises a "stateless server" using a "stateless protocol" for communications treating each request and answer in a communication session as an independent transaction unrelated to any previous communication so that the communication consists of independent pairs of requests and responses. In these illustrative examples, server 211 does not retain session information or status about client 225 or the communication with client 225; client 225 retains the session information and thus is statefull.

In these illustrative examples, performance monitor 234 operating on client 225 monitors performance metrics relating to the communication between the client 225 and the server 211. For example, signal strength metrics, signal quality metrics, bit rate metrics, coding standard metrics, portion 219 size metrics, available bandwidth metrics, bandwidth used metrics, memory storage utilization metrics, and memory storage available metrics are possible metrics monitored by performance monitor 234. Signal quality metrics can also include resolution and quality of the video picture received.

In these illustrative examples, communication environment monitor 238 provides additional performance metrics to performance monitor 234. For example, communication environment monitor 238 may provide signal strength metrics, signal quality metrics, data traffic metrics, cell location metrics, client movement speed metrics, and client movement vector metrics. As depicted, state manager 233 can track the metrics of performance monitor 234 and communication environment monitor 238 for use by client 225. In these illustrative examples, client 225 can respond to changes in the performance metrics monitored by performance monitor 234. For example, client 225 can responds to a change in signal strength and signal quality monitored and measured by performance monitor 234 and communication environment monitor 238 to modify the size and video resolution, quality of media, encoding standard, or some other adjustment to portion request 227 to address the specific metric change. As depicted, in generating portion request 227, portion request module 226 uses metadata 213, preferences 235, rules 236, policies 250, and metrics from performance monitor 234 and communication environment monitor 238. Within the confines of these sometimes-conflicting inputs and requirements, portion request module 226 manages and adjusts portion request 227 to generate portion 219 for viewing on client 225.

In these illustrative examples, as changes become necessary to modify portion request 227, in some embodiments, the client 225 can transmit a cancel command to stop generating one or more portion 219, and the client 225 can generate a new portion request 227 incorporating adjustments as required to address metadata 213, preferences 235, rules 236, policies 250, and metrics from performance monitor 234 and communication environment monitor 238. For example, if four portion request 227 remain pending with no corresponding portion 219 received, in response to one or more metric changes client 225 can transmit a cancel command to stop server 211 from processing one or more of the portion request 227.

As depicted, client 225 can generate four modified portion request 227 addressing the metric changes. The ability to stop generation of prior portion request 227 can be dependant on a parameter, such as for example the number of pending portion request 227, a threshold size of portion 219, or a threshold for latency between receiving portion request 227 and generating corresponding portion 219. Threshold for latency refers to a minimum specified amount of time for the message packet containing the portion to travel from server 211 to client 225. However, in other embodiments, the server 211 may be retrieving portion 219 so fast based on portion request 227 that insufficient latency exist to cancel a pending portion request 227, and client 225 simply must modify portion request 227 on-the-fly with the older portion request 227 generating portion 219 without modification. In these illustrative examples, client 225 request portion 219 on-the-fly with minimal memory storage of pending portion request 227 in a queue.

In these illustrative examples, preferences 235 is a list of preferences of the preferred communication environment of client 225, such as for example a display size, a buffer size, a bit rate, a signal quality, a video resolution, a sound resolution, a closed caption enablement, and any other suitable preference for a media device such as client 225. As depicted, rules 236 are restrictions that apply to media 216. For example, rules 236 may include a plurality set of portions available to client 225, list of portion permitted to store on client 225, number of bytes permitted to store on client 225, limit the number of bytes permitted to download, limit the size of portion 219, limits on portion 219 storable on client 225, media access by client 225, and concurrent download authorization for client 225. For example, client 225 may be configured to block particular media, to limit a total number or total size of media data downloads over a particular period of time, to restrict editing of content from a particular media stream, to block live media, and to permit audio media downloads only.

As illustrated, rules 236 can be set on the client 225, such as by a parent user for a child user of client 225. For example, a user may configure client 225 to block certain media 216. In other illustrative examples, rules 236 can also be set by data in or associated with portion 219, such as in response to received digital rights management 251 data in portion 219, client 225 plays portion 219 with a specified restricted resolution and required bit rate. In another example, preferences 235 can specify the desired encoding format, MPEG-2 versus MPEG-4 as one example. Preferences 235 also may include a preferred or optimal buffer size, video resolution, and closed captioning enabled. Moreover, since the server is stateless and only the client is statefull, each portion 219 can reflect different preferences 235 or rules 236. For example, client 225 changes portion request 227 to alter subsequent portion 219 in the media stream to enhance closed captioning data and delete audio data from the stream, restrict future content of the stream to edit out certain ones of portion 219, as for example switching from a parent user to a child user, or to permitting certain ones of portion 219 to play, as for example switching from a child user to a parent user.

In these illustrative examples, state manager 233 along with preferences 235 and rules 236 manage portion 219. For example, state manager 233 may be set according to preferences 235 to control or specify display size, bit rate, and signal quality of transmission, or streaming, of portion 219. State manager 233, as another example, may be set according to rules 236 to limit the numbers of bytes downloaded, size of buffer, and size of portion 219. As depicted, portion 219, on the other hand, may include information to edit, permanently or temporarily, or set preferences 235 or rules 236. In these illustrative examples, alternatively preferences 235 and rules 236 may manage portion 219 independent of state manager 233 to control playing of portion 219 and function of client 225.

In these illustrative examples, client 225 includes client display 237 for playing video media. In other examples, client 225 may lack a suitable client display 237 and thus limited to audio media. As depicted, client 225 may also include a communication environment monitor 238 to monitor various metrics relating to the communication system and environment.

As depicted, media environment 239 provides content 240 to server 211 including media 216. In these illustrative examples, content 240 comprises data from media source 241 to transmit to server 211. As depicted, media source 241 can comprise live media 242 with audio 243 and video 244 components. In these illustrative examples, media source, for example media source 241, can comprise vendor 245, subscriber service 246, media web host 247, previously recorded 248, and pay per view service 249. As depicted, live media 242 provides media 216 from a real-time transmission. That is, digital movie cameras and audio devices capture a live event to generate live media 242 and stream the data in real time to server 211. In these illustrative examples, vendor 245 can include selling media 216 for a one-time, limited time frame viewing, or even recording/storing media 216. Subscriber service 246 can include selling media 216, which can include live or stored media 216. Media web host 247 can include live or stored recorded media 216 for free viewing. In these illustrative examples, media web host 247 may provide media 216 such as, for example, delayed television network programming. For example, previously recorded 248 can comprise free service with unlimited downloads of media 216, and pay per view service 249 can comprise pay per view service with charges for a single viewing or viewing within a specified time frame.

In these illustrative examples, content 240 from media source 241 may also provide live performance data generated by audio video recording devices as live media 242 or media 216 previously recorded and stored on a server. As depicted, vendor 245, subscriber service 246, media web host 247, and pay per view service 249 can all provide live performance data. In these illustrative examples, associated with each media source, such as media source 241, and content 240 are policies 250 for managing content 240. For example, digital rights management 251 in policies 250 may limit the use of content 240 by particular devices to only those usages desired by media source 241 or the owners of intellectual property rights in content 240. In these illustrative examples, various policies 250 can also, for example, limit the viewable portion of content 240, limit number of bytes of content 240 storable, limit number of downloadable content 240, limit number of viewings of content 240 a restrictive date range for access to content, limit the quality of content 240 in a stream for free viewing, and block copying of content 240.

As depicted, digital rights management 251 in policies 250 limits usage of content 240 to only those uses authorized by the intellectual property owner. In these illustrative examples, digital rights management 251 can, for example, limit the amount of data that can be downloaded by client 225, limit a number of times content 240 can be accessed, limit which portion 219 of the audio video media can be played by the client 225, mandate a minimum quality for download, limit encoding for download, and block conversion to other formats of content 240. In these illustrative examples, digital rights management 251 can include and implement restrictive licensing agreements governing the access to the content 240, as well as copyright and public domain controls. In these illustrative examples, digital rights management 251 can impose restrictive licenses as a condition of entering a website to access a media source 241 or before downloading content 240. In these illustrative examples, digital rights management 251 can also include encryption protocols scrambling content absent the proper encryption keys to decode content 240.

In these illustrative examples, client 225 can use policies 250 to set rules 236 on client 225. In some illustrative examples, policies 250 associated with media 216 can be transmitted to client 225 to configure rules 236 before creating portion request 227, such as, for example, configuring client 225 upon initial registration with subscriber service 246 based on a chosen service plan. Other illustrative examples may embed polices 250 into the data packet stream used to transmit potion 219 to client 225 to set or change rules 236. In these illustrative examples, some policies 250 can, alternatively as one example, cause server 225 to limit the number of bytes in generating portion 219 and enact a restrictive time frame controlling when content 240 can be accessed.

As depicted, client 225 can access policies 250 using server 211 by contacting media environment 239, or client 225 can access policies directly on media environment 239 without using sever 211. In another example, server 211 can access policies 250 upon receipt of a request for media 216 available on server 211, upon receipt of portion request 227, or upon receipt of content 240. As depicted, server 211, in some illustrative embodiments, can store policies 250, and in some illustrative embodiments client 225 can store policies 250. As depicted, client 225 uses policies 250, preferences 235, rules 236, metadata 213, and metrics from performance monitor 234 and communication environment monitor 238 to generate portion request 227.

With reference to FIG. 3, an illustrative diagram of a communication environment monitor is depicted in accordance with an illustrative embodiment. It should be appreciated that FIG. 3 is only provided as an illustration of one implementation and is not intended to imply any limitation with regard to the architecture in which different embodiments may be implemented. Many modifications to the depicted architecture may be made.

As depicted, communication environment monitor 300 can be implemented on client 225 of FIG. 2 as communication environment monitor 238, and it can include locator 305 operating in conjunction with route identifier 310. In these illustrative examples, client 225 of FIG. 2 can store information regarding its communication environment, such as data on cell 1 315, cell 2 320, cell 3 325, and cell 4 330. As depicted, route identifier 310 can determine data relating to movement vector 350 and signal strength indicating impending movement from cell 3 325 to cell 2 320. In these illustrative examples, client 225 of FIG. 2 can dynamically respond to the hand off to another transceiver by increasing the size or otherwise adjusting portion 219, considering policies 250, preferences 235, rules 236, metadata 213, and metrics from performance monitor 234 and communication environment monitor 238 of FIG. 2. In these illustrative examples, increasing the size of the portion 219 avoids disruption of the streaming media 216 from buffer latency that can interfere with playing media 216 during a hand off. Buffer latency can occur during a hand off, when data is buffered in a memory associated a server on the cell site while a mobile communication device completes registration and authentication onto a new cell site. If registration and authentication takes to long, the buffer empties interrupting play. By requesting a larger portion 219, the client 225 can buffer one or more larger portion 219 to play un-interrupted during hand off.

As depicted, client 225 can generate portion 219 considering, as an example, policies 250 limiting the size of portion 219 and encoding format, preferences 235 relating to display size and resolution, rule 236 blocking access to portions of content 240, and metadata 213 giving encoded format available, size of encoded media 217, and indicator that encoded media 217 is not live. In these illustrative examples, client 225 maintains state information, and thus is statefull, while server 211 remains stateless. Because only client 225 participates in the entire streaming or downloading of media 216, compared to servers managing communication at each cell site, e.g., referring to FIG. 1 cell sites 110, 120, 130, and 140, only client 225 can preserve and use state data for requesting and transmitting portion 219.

With reference now to FIG. 4, an illustration of a streaming media architecture is depicted in accordance with an illustrative embodiment. It should be appreciated that FIG. 4 is only provided as an illustration of one implementation and is not intended to imply any limitation with regard to the architecture in which different embodiments may be implemented. Many modifications to the depicted architecture may be made.

As depicted, streaming media architecture 400 is a network of computers in which the illustrative embodiments may be implemented. Client 405 connects with wireless communication network 415, such as, for example, mobile communication system 100 and the cellular network in FIG. 1. Client 405, in one illustrative example, can comprise a wireless communication device implemented using a processor configured to execute computer code. More typically, client 405 comprises a smartphone device configured and capable of playing streaming media. A "smartphone" as defined herein, means a high-end mobile cell phone combining functions of a personal digital assistant (PDA), also referred to as a palmtop computer, and a mobile cellular telephone, with a processor and memory configured to execute program code and process data. Smartphones can usually operate as portable media players using a high-resolution touchscreen with a web browser that can access and properly display standard web pages. Smartphones also typically possess more advanced computing ability and connectivity than more conventional cellular phones, although the distinction can be vague and there is no official definition for what constitutes the difference between them. Current popular cellular phones that meet the definition of a smartphone, as example embodiments and not as a limitation, include Apple's® iPhone®, LG's® Revolution®, Motorola's® Droid X2® Nokia's® Sybian®, Research in Motion's® (RIM®) BlackBerry® Torch®, and Samsung's® Galaxy® or Droid Pro®.

As depicted, communication network 415 also connects to server 420. Server 420 can function as a web server, media server, hypertext transport protocol (HTTP) server, hypertext transport protocol live streaming (HTTP-LS) server, or some other server supporting media streaming. As depicted, communication network 415 also connects to media source 425, which can comprise a plurality of media sources such as, with reference to FIG. 2, by example only and not as a limitation, content 240 that can include live media 242, vendor 245, subscriber service 246, media web host 247, previously recorded 248, or pay per view service 249. In these illustrative examples, communication network 415 supports communication between client 405, server 420, and media source 425 using both surface and wireless communication links. Surface communication links can be comprised of wire cable or fiber optic cable links, such a cellular system depicted in FIG. 1. In these illustrative examples, media 216 in FIG. 2 furnished client 405 can be stored in its entirety on server 420, or server 420 can facilitate transmitting streaming media from media source 425 to client 405.

As depicted, client 405 receives metadata 430 from server 420 on media available from server 420. In these illustrative examples, metadata 430 can comprise information on media files that can include, for example, a name for the media file, byte length of the media file, memory locations where the media file is stored, live media indicator, policy data such as digital rights management information 251 of FIG. 2 that can place limits on generation of portion 219 or set rules 236, duration of access to the encoded media file 217, frame width, frame height, frame rate video was recorded with, and encoding standard. In these illustrative examples, list generator module 435 uses metadata 430 along with policies 250, preferences 235, rules 236, and metrics from performance monitor 234 and communication environment monitor 238 to generate list of portions 229 and play sequence 230 of FIG. 2. In these illustrative examples, user interface 440 allows a user of client 405 to select an encoded media file 217 of FIG. 2 for playing on client 405. In these illustrative examples, portion request module 445 receives selection input from user interface 440 to generate portion request 227 of FIG. 2, also using policies 250, preferences 234, rules 236, metadata 430, and metrics from performance monitor 234 and communication environment monitor 238 to generate portion request 227. As depicted, list generator module 435 generates list of portions 229 responsive to inputs from communication performance monitor 234 or communication environment monitor 238 as well as considering policies 250, preferences 235, rules 236, metadata 430, and data stored by state manager 233 of FIG. 2, in conjunction with portion request module 445, to adjust the portion request 227 of FIG. 2 and compensate for changes in the communication performance or environment.

In these illustrative examples, server 420 receives media data as media 216 of FIG. 2 from a media source 425 over communication network 415 that media encoder 450 processes to produce encoded media file 217 of FIG. 2. In these illustrative examples, media encoder 450 also generates in part the metadata 430 to describe encoded media file 217 of FIG. 2. For example, metadata 430 can contain data providing a starting byte location and ending byte location that can comprise a byte length of the encoded media file 217 as well as memory addresses storing the bytes on server 420. In these illustrative examples, metadata 430 can also comprise data provided by media source 425 and media encoder 450. In these illustrative examples, portion request module 445 transmits output, i.e., a portion request 460, over communication network 415 to server 420. As depicted, media processor 455 processes portion request 460 outputted by portion request module 445 to retrieve portion 457 identified by portion request module 445 in portion request 460. In these illustrative examples, media processor 455 copies the portion of identified encoded media file 217 of FIG. 2 specified by a byte begin location 221 and a byte end location 222 of FIG. 2. The byte begin location 221 and end location 222 of FIG. 2 can comprise memory addresses, byte length designations, timestamp data, a combination, or some other method to designate and identify the beginning and ending of a segment of stored encoded media file 217. In these illustrative examples, media processor 455 copies the parts of encoded media file 217 specified in the portion request 460 to configure and generate portion 457. As depicted, encoded media file 217 remains intact and un-partitioned. In these illustrative examples, media processor 455 then provides portion 457 to client 405 using stream handler 223 of FIG. 2. The received portion 457 can then be buffered in memory and played on client display 465, which can comprise a screen and speaker.

With reference now to FIG. 5, an illustration of a flowchart for a client media process is depicted in accordance with an illustrative embodiment. The client media process 500 is an illustrative example of the implementation on a client to play streaming media referring to client 405 in FIG. 4. It should be appreciated that FIG. 5 is only provided as an illustration of one implementation and is not intended to imply any limitation with regard to the process in which different embodiments may be implemented. Many modifications to the depicted process may be made.

As depicted, the process initiates at step 505 with a request for information on available media from server 420. In these illustrative examples, this request, for example, can occur based on results from a web browser search, media advertisement, or web link connection. The request can further comprise a general request giving results for a plurality of media files such as all movies, or a specific request for a single media file such as for a specific identified movie, or a less restrictive request for a limited number of files, such as media files related to a particular movie genre. A general listing of a plurality of media files or a single media file may result from an initial request.

As depicted, in response to the request, client 405 can receive metadata 430 with information on an available, encoded media file (step 510). In these illustrative examples, metadata 430 of FIG. 4 received can include, for example, the name for the media file, a byte length, memory location, live media indicator, policy data, digital rights management information, and encoding standard. Metadata 430 can also, in an illustrative example, cover a plurality of media files. In these illustrative examples, metadata 430 can also contain policies 250 for use or to configure rules 236 and preferences 235 of FIG. 2 on client 405.

From the received metadata 430 and other inputs such as, for example, policies 250, preferences 235, rules 236, and state manager 233 of FIG. 2, client 405 can generate a list of portions 229 on list generator module 435 for breaking down encoded media file 217 into encoded media file portions (step 515). In these illustrative examples, for live media, the length of encoded media file 217 of FIG. 2 remains unknown, as only a small number of bytes of the total length of bytes in the file may have been generated. In these illustrative examples, client 405, and more particularly, list generator module 435 of FIG. 4, assigns a pre-determined length to generate the final portion 457 from the available bytes on the server 420 based on a probable length for that particular portion 218.

In these illustrative examples, a plurality of encoded portion 457 can be arranged in play sequence 230 and may be adjusted based on metrics monitored by communication performance monitor 234 or communication environment monitor 238 of FIG. 2. For example, when the communication link between client 405 and server 420 is exceptionally good, client 405 can selectively increase the size of portion 457 requested to minimize protocol chatter and help to reduce latency and bandwidth usage of FIG. 4. If client 405 movement places it on the edge of cell site coverage, client 405 can also increase the size of portion 457 requested of FIG. 4, minimizing the probability of play disruption or lost message packets.

As depicted, once list generator module 435 generates list of portions 229 of FIG. 2, a user may be able to select either a portion of the media file to play or the entire media file to play. In these illustrative examples, client 405 operates to identify at least one portion 457 of FIG. 4 according to list of portions 229 of FIG. 2 to retrieve (step 520). In these illustrative examples, using list of portions 229, client 405 creates portion request 460 using portion request module 226 to request identified portion 457 of the list of portions 229 of FIG. 2 (step 525). As depicted, portion 457 requested also correlates to play sequence 230.

However, client 405 can also use list generator module 435 of FIG. 4 and portion request module 226 to generate list of portions 229 of FIG. 2, play sequence 230, and portion request 460 to implement fast forward, reverse, or fast reverse functions. In these illustrative examples, client 405 can also be used to skip ahead or reverse to selectively play portion 457 out of sequence either forward or reverse. This gives client 405 greater flexibility as to how to present the media and the granularity of control provided to the user.

As depicted in step 530, client 405 transmits portion request 460 to server 420 corresponding to at least one of identified portion 457 of FIG. 4 on list of portions 229 of FIG. 2. In response, client 405 receives requested portion 457 of encoded media file 217 and stores portion 457 in buffer 231 for playing (step 540). Buffer 231 of FIG. 2 can store a plurality of portion 457 of FIG. 4 to play according to play sequence 230. In these illustrative examples, portion 457 can also contain policies 250 such as digital rights management 251 for configuring rules 236 or preferences 235 of FIG. 2 on client 405 and control access to, or otherwise limit, client 405 usage to only those uses authorized. As depicted, client 405, for example, can be configured to limit the viewable portion media, limit number of bytes of media storable on a device, limit number of bytes of media that are downloadable on a device, limit number of viewings on a device, limit a date range for access to media, limit a quality of the media in a stream of media for free viewing, and block copying of the media.

Subsequent to portion 457 being buffered into a memory, client 405 plays received portion 457 in accordance with any policies or rules set on the client (step 545). As depicted, client 405 then clears the played portion 457 from buffer 231 (step 550).

At step 555, client 405 determines if the end of the media stream making up the complete requested portions of the media file was received, such as may occur for a live event. In these illustrative examples, if client 405 received the final portion of the media stream making up encoded media file 217, the process ends.

If the end of the media stream making up the entire encoded media file 217 was not received in step 555, such as for live streaming, then client 405 updates the list of portions 229 of FIG. 2 (step 560). In these illustrative examples, this may require re-generating or appending list of portions 229 to further divide and add the new bytes received and available on the server 420. This creates one or more new portion 457 of FIG. 4 by generating additional identified portions on the list of portions 229 and adds to play sequence 230 of FIG. 2. In these illustrative examples, for a live event, new generated potion 457 of FIG. 4 should include at least part of the event occurring during the generating, downloading, and playing of previous portion 457. As depicted in step 565, client 405 identifies the next portion 457 of the encoded media file according to identified portions on list of portions 229 (step 565). From step 565, the process proceeds to step 525.

With reference now to FIG. 6, an illustration of an audio visual media list generated by a client is depicted in accordance with an illustrative embodiment. Audio visual list 600, in one illustrative example, can be generated by the client 225 on the list generator module 228 and list portions to request portion 219 from a server 211 of FIG. 2. It should be appreciated that FIG. 6 is only provided as an illustration of one implementation and is not intended to imply any limitation with regard to the process in which different embodiments may be implemented. Many modifications to the depicted process may be made.

As depicted, audio visual media list 600 comprises a listing that includes identifier 601 for a portion. In these illustrative examples, identifier 601 can be a media file name, such as for example a movie title, an alphanumeric designation, a derivative name based on the name of the media file such as an abbreviated movie title, or some other media file name or alphanumeric designation. Typically, in these illustrative examples, identifier 601 corresponds to the name of the media file. Sequence number 602 designates an order for playing the portions and organizing the portions into a play sequence. As depicted, sequence 0002 directly follows sequence 0001 in a play sequence. Alternatively, in these illustrative examples, audio visual media list 600 can arrange the portions out of sequence for retrieval to play according to play sequence 230 of FIG. 2. As depicted, begin 603 designates the beginning location of the portion and can comprise a memory location storing the beginning byte of the portion, a time stamp associated with each byte of memory representative of elapsed play time to the beginning of the byte or media file, or a byte length designation corresponding to the beginning byte location in the total byte length of the media file. As depicted, end 604 designates the ending location of the portion and can comprise a memory location storing the ending byte of the portion, a time stamp associated with each byte of memory representative of elapsed play time to the ending of the byte, or a byte length designation corresponding to the ending byte location in total byte length of the media file.

As depicted, portion 1 605 marks the first portion generated and typically corresponds to the first portion to play in play sequence 230 of FIG. 2 designating the order of play for the retrieved portions. In these illustrative examples, the identifier for portion 1 605 is moviel with a sequence number of 0001. As depicted, begin 603 location of AAAA designates the beginning location of the 0001 sequence in the encoded media file, while end 604 location BBBB designates the ending location. As depicted, portion 2 610 marks the second portion generated and typically corresponds to the second portion to play in the play sequence designating the order of play for the retrieved portions. In these illustrative examples, identifier 601 for portion 2 610 is moviel with sequence number 602 of 0002. As depicted, begin 603 location of CCCC designates the beginning location of the portion 0002 in the encoded media file, while end 604 location DDDD designates the ending location.

In the illustrative example, portion 3 615 marks the third portion generated and typically corresponds to the third portion to play in the play sequence designating the order of play for the retrieved portions. In these illustrative examples, identifier 601 for portion 3 615 is moviel with sequence number 602 of 0003. As depicted, begin 603 location of EEEE designates the beginning location of the portion 0003 in the encoded media file, while end 604 location FFFF designates the ending location. As depicted, portion (n) 620 marks the nth portion generated and corresponding to the final portion to play in the play sequence designating the order of play for the retrieved portions. In these illustrative examples, identifier 601 for portion (n) 620 is moviel with a sequence number of "####" or the final sequence generated. As depicted, begin 603 location of YYYY designates the beginning location of the final portion #### in the encoded media file, while end 604 location ZZZZ designates the ending location. In these illustrative examples, the portions in this example are contiguous portions in encoded media file 217 of FIG. 2 listed in sequence and played in sequence from beginning location AAAA to ending location ZZZZ. In these illustrative examples, however, alternatively, the AAAA begin 603 location can designate any point within the encoded media file and not the beginning and can be arranged out of sequence but requested and played in sequence according to sequence player 230 of FIG. 2.

With reference now to FIG. 7, an illustration of an audio visual media list generated by a client is depicted in accordance with an illustrative embodiment. Audio visual list for fast reverse 700 is one illustrative example that can be generated by the client on list generator module 228 and list portions to request from server 211 of FIG. 2. It should be appreciated that FIG. 7 is only provided as an illustration of one implementation and is not intended to imply any limitation with regard to the process in which different embodiments may be implemented. Many modifications to the depicted process may be made.

As depicted, audio visual media list for fast reverse 700 comprises a listing that includes identifier 701 for a portion. In these illustrative examples, identifier 701 can be a media file name, such as for example a movie title, an alphanumeric designation, a derivative name based on the name of the media file such as an abbreviated movie tile, or some other media file name or alphanumeric designation. Typically, in these illustrative examples, identifier 701 corresponds to the name of the media file. As depicted, sequence number 702 designates an order for playing the portions and organizing the portions into play sequence 230 of FIG. 2. As depicted, sequence 0002 directly follows sequence 0001 in a play sequence.

As depicted, begin 703 designates the beginning location of the portion and can comprise a memory location storing the beginning byte of the portion, a time stamp associated with each byte of memory representative of elapsed play time to the beginning of the byte, or a byte length designation corresponding to the beginning byte location in total byte length. As depicted, end 704 designates the ending location of the portion and can comprise a memory location storing the ending byte of the portion, a time stamp associated with each byte of memory representative of elapsed play time to the ending of the byte, or a byte length designation corresponding to the ending byte location in total byte length. In these illustrative examples, the media stream implements a fast reverse function as requested by portion request 227 as listed in list of portions 229 of FIG. 2.

In the illustrative example, portion 1 705 marks the first portion generated and typically corresponds to the first portion to play in play sequence 230 of FIG. 2 designating the order of play for the retrieved portions. In these illustrative examples, however, play sequence 230 generated is in reverse order. That is, instead of a normal play sequence beginning at begin 603 AAAA and progressing forward to end 604 address ZZZZ as in FIG. 6, the fast forward function begins within a file and advances out of sequence, in this example, in reverse order from NNNN to AAAA, and plays in reverse order. In other words, in these illustrative examples, all bytes play in reverse order compared to normal forward play. In these illustrative examples, identifier 701 for portion 1 705 is moviel with sequence number 702 of 0001. As depicted, begin 703 location of NNNN designates the beginning location of the 0001 sequence in the encoded media file, while end 704 location MMMM designates the ending location. In these illustrative examples, however, rather than the beginning of encoded media file 217, NNNN designates some other location within the encoded media file 217 of FIG. 2.

As depicted, portion 2 710 marks the second portion generated and typically corresponds to the second portion to play in play sequence 230 designating the order of play for the retrieved portions. As depicted, identifier 701 for portion 2 710 is moviel with sequence number 702 of 0002. As depicted, the begin 703 location of JJJJ designates the beginning location of portion 2 710 in the encoded media file, while end 704 location IIII designates the ending location. In these illustrative examples, however, sequence number 0002 does not correlate to the next contiguous sequence in encoded media file 217 but rather correlates to some other earlier sequence in encoded media file 217 of FIG. 2. Rather than a progressive, contiguous sequence one after the other in a forward direction, portion 2 710, sequence 0002 skips backward to retrieve a non-contiguous portion in reverse.

In the illustrative example, portion 3 715 marks the third portion generated and typically corresponds to the third portion to play in the play sequence designating the order of play for the retrieved portions. As depicted, identifier 701 for portion 3 715 is moviel with sequence number 702 of 0003. As depicted, begin 703 location of FFFF designates the beginning location of the portion 0003 in the encoded media file, while end 704 location EEEE designates the ending location. As depicted, portion (n) 720 marks the nth portion generated and corresponds to the final portion to play in the play sequence designating the order of play for the retrieved portions to implement fast reverse. As depicted, identifier 701 for portion n 720 is moviel with sequence number 702 of "####" or the last sequence generated. As depicted, begin 703 location of BBBB designates the beginning location of the final portion #### in the encoded media file, while AAAA designates end 704 location and, in this example, the beginning of encoded media file 217 of FIG. 2. In a similar manner, a fast forward operation can be played by requesting non-contiguous portions. Similar to FIG. 6 in these illustrative examples, a reverse function can be implemented by reversing the order of the portions requested and playing in contiguous order.

In FIG. 8, an illustration of a streaming media data structure is depicted in accordance with an illustrative embodiment. Streaming media data structure 800 is one illustrative example data structure of an embodiment on client 405 of FIG. 4 of data elements used by client 405 used to request portion 457 and includes audio visual media name 805 generally corresponding to the name of the encoded media file. It should be appreciated that FIG. 8 is only provided as an illustration of one implementation and is not intended to imply any limitation with regard to the process in which different embodiments may be implemented. Many modifications to the depicted data structure may be made.

In these illustrative examples, audio visual media list 810 generally comprises the same data of FIG. 6 for a portion, which can include a portion identifier in the list of portions and a begin location and an end location for the portion. In these illustrative examples, audio visual media list 810 generally also comprises the play sequence for the portion, but play sequence 230 of FIG. 2 can control the sequence in which portion 457 plays, actually playing the portions out of the listed sequence.

As depicted, total byte length of media file 820 can be useful for live media. The server can use this total byte length to help determine if the media comprises live media, as this value will not equal the total byte length stored on server 420 of FIG. 4. In these illustrative examples, a mismatched value for total byte length between server 420 and of client 405 of FIG. 4 can indicate media is live media. For recorded media content, the value of total byte length for server 425 and client 405 matches. However, for live media, the total byte length does not match, at least not till the live event ends. Live media can be indicated by this means or in metadata 213 of FIG. 2, but this means can alternative or also be used to indicate the end of live media.

Client 405 receives an indicator that live media has ended from server 420 in the illustrative examples. For example, client 405 can make a portion request 460 having a begin indication and end indication for portion request 460, with server 420 calculating the end of portion request 460 extending beyond the end of the media. In these illustrative examples, because server 420 recognizes the media as live media, server 420 continues sending the portion as it arrives from media source 425 and as requested by client 405. But, unless client 405 receives an indication that the live media ended, the client continues making media request. In these illustrative examples, if the total byte length of media file 820 on client 405 of FIG. 4 matches the total byte length of media file on server 420, server 420 can indicate an end of the media stream in the next transmitted portion 457, and client 405 can terminate the session.

As depicted, type 825 can designate a requested or preferred file encoding standard for audio visual, audio or visual only, live event, or pre-recorded and stored. In these illustrative examples, type 825 can specify the coding standard, such as the audio standard, which include for example G.711, G.723, G.726, G.729, GSM, QCELP, MP3, and DTMF, or the video standard such as H.261, H.263, H.264, MPEG-1, MPEG-2, and MPEG-4.

In these illustrative examples, type 825 can also indicate whether the media requested comprises multimedia, interactive video game, personal communication, multimedia email, video surveillance, emergency system messaging, or broadcasting media stream. As depicted, server 420 can use this information contained in a portion request 460 to generate the portion 457 with the correct coding standard optimized for the specified media.

In these illustrative examples, policies 830 can designate the policies applicable to encoded portion 457 of FIG. 4 such as, for example, digital rights management, preferences, codec standard, minimum bandwidth requested to stream portion 457, requested bit rate to stream and play portion 457, minimum preferred signal quality standard for portion 457, encoded frame rate, frame size, encryption standard for securing the stream transmission of portion 457, data storage limitation on client 405, and maximum byte size supported by client 405. In these illustrative examples, these policies 830 enable client 405 to request portion 457 on-on-the-fly from server 420, adapting to changes detected by client 405 of FIG. 4 during a communication session.

In these illustrative examples, status 835 can indicate, for example, an impending change in file transmission quality for portion 457, congestion problems in the communication environment caused by high traffic or demand, low available bandwidth, service interruption warning or indicator, low available resources, or service interruption. As depicted, status 835 can be derived from policies 250, preferences 235, rules 236, and state manager 233 of FIG. 2. In these illustrative examples, commands 840 can include, for example, a teardown command to server 420 to terminate the communication link and can be used to terminate live streaming of a media event, a pause command can temporarily stop streaming, a record command can request server 420 send a number of bytes to a memory or the buffer as dictated by policies 250, preferences 235, or rules 236, state manager 233, or monitored metrics of FIG. 2.

In these illustrative examples, policies 830, status 835, and commands 840 data can be stored and tracked by state manager 233 and/or used by client 405 to provide enhanced flexibility and control over the media stream as the data components are used to generate each portion request 460. As depicted, in conjunction with state manager 233, client 405 can control most aspects of the streaming media data, making changes on-the-fly during a single communication session to generate and modify the media packet by modifying the portion request 460 of the media stream, rather than having static streaming media data during a communication session lacking any client control over the generation of media data packets making up the media stream.

Figure 9:
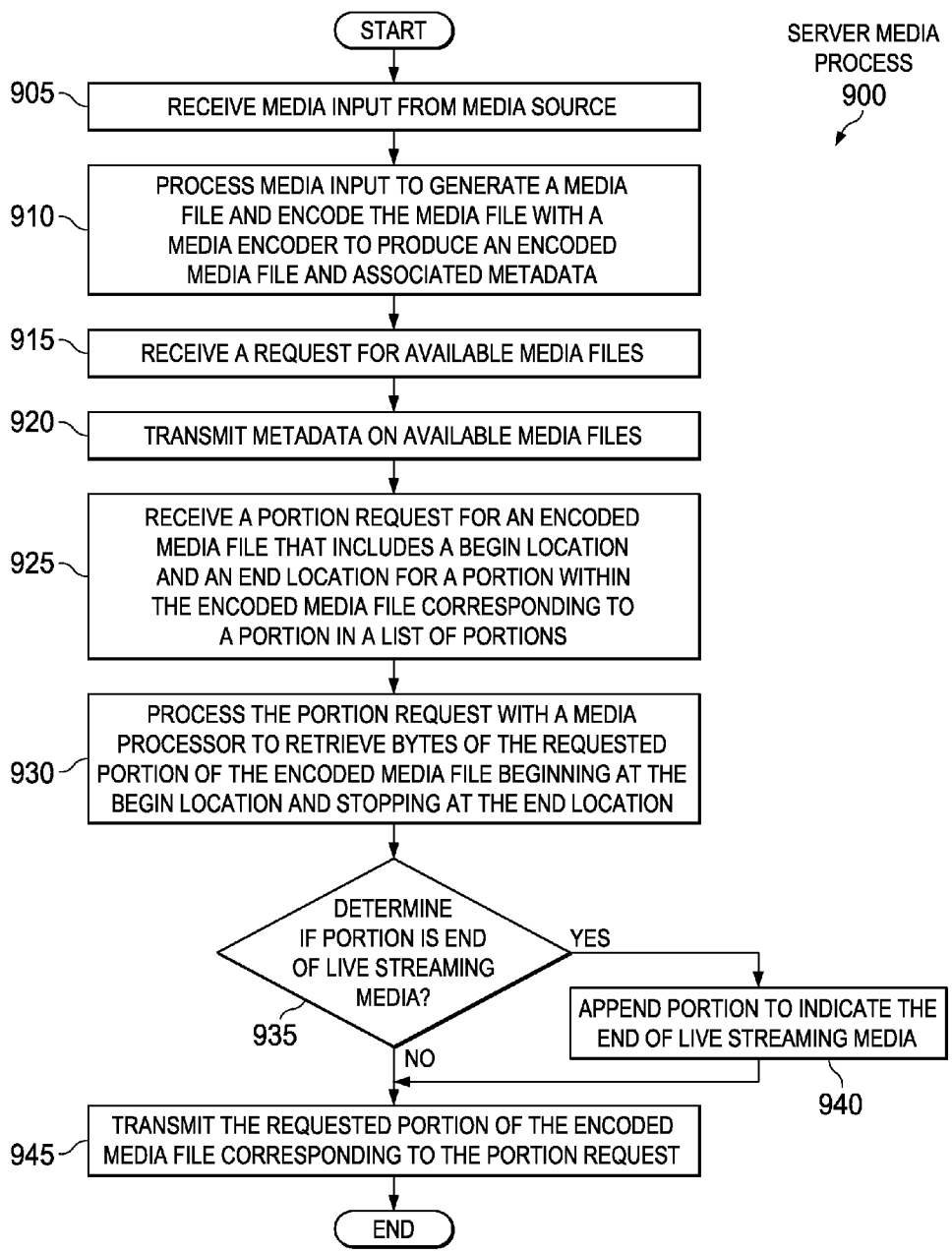
FIG. 9 is an illustration of a flow chart for a server media process in accordance with an illustrative embodiment.

With reference now to FIG. 9, an illustration of a flowchart for a server media process is depicted in accordance with an illustrative embodiment. Server media process 900 is an illustrative example of the implementation on a server to play streaming media referring to server 420 in FIG. 4. It should be appreciated that FIG. 9 is only provided as an illustration of one implementation and is not intended to imply any limitation with regard to the process in which different embodiments may be implemented. Many modifications to the depicted process may be made.

As depicted, the process begins with server 420 receiving media input from a media source (step 905). In these illustrative examples, server 420 of FIG. 4 processes media input to generate media 216 and encodes media 216 with a media encoder 215 to produce encoded media file 217 of FIG. 2 and associated metadata 430 (step 910). In step 915, server 420 receives a request for available media files, and in response server 420 transmits metadata 430 of FIG. 4 on available media files (step 920).

As depicted, server 420 can receive portion request 460 to request part of encoded media file 217 that includes a begin location and an end location for a portion within the encoded media file 217 corresponding to a portion 457 in list of portions 229 (step 925). In these illustrative examples, the begin location and end location can comprise a byte address location address in memory, a byte length, a timestamp associated with the portion, or some other designation protocol to designate a set of bytes for processing. In these illustrative examples, server 420 processes portion request 460 of FIG. 4 with media processor 218 of FIG. 2 to copy and process bytes of the requested portion of the encoded media file starting at the begin location and stopping at the end location (step 930), which creates portion 457. As depicted, server 420 determines if portion 457 is the end of live streaming media (step 935). That is, for live media, the client 405 of FIG. 4 does not know the total size of encoded media file 217 and list of portions 229 of FIG. 2, and play sequence 230 must be updated to create additional portion request 460 of FIG. 4. In these illustrative examples, unless the client 405 receives an indication that live media ended, client 405 continues transmitting portion request 460 after the end of a live event. As depicted, if portion 457 is the end of live streaming media, then server 420 appends portion 457 of FIG. 4 to indicate end of live media streaming (step 940) and then proceeds to step 945. As depicted, if portion 457 is not the end of live media in step 935, then server 420 transmits portion 457 of FIG. 4 of encoded media file 217 of FIG. 2 corresponding to the portion request 460 of FIG. 4 (step 945).

Figure 10:
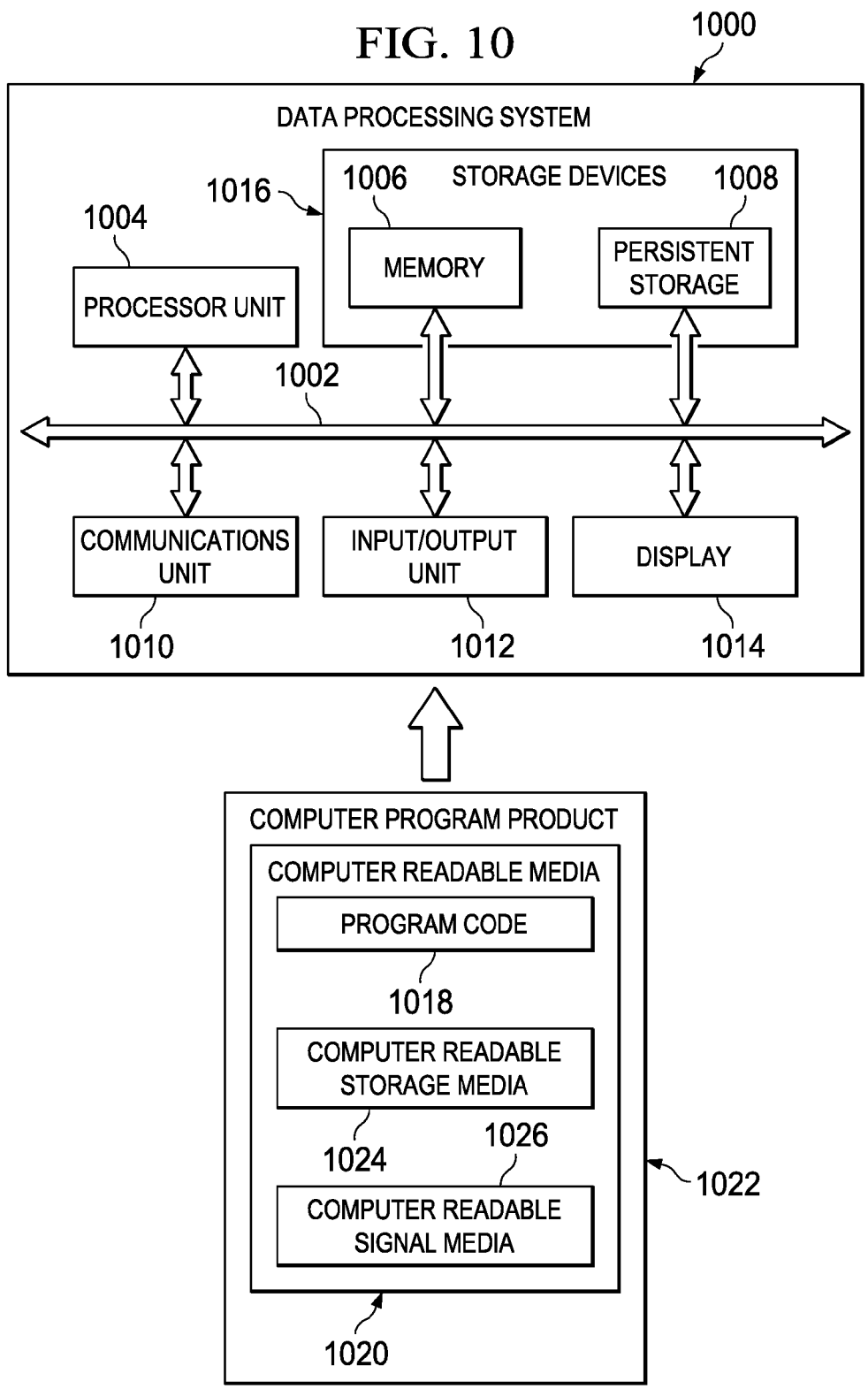
FIG. 10 is an illustration of a block diagram of a data processing system in accordance with an illustrative embodiment.

Turning now to FIG. 10, an illustration of a block diagram of a data processing system is depicted in accordance with an illustrative embodiment. In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to process instructions for software that may be loaded into memory 1006. Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for processing by processor unit 1004. The processes of the different embodiments may be performed by processor unit 1004 using computer implemented instructions, which may be located in a memory, such as memory 1006.

These instructions are referred to as program code, computer usable program code, or computer readable program code that may be read and processed by a processor in processor unit 1004. The program code in the different embodiments may be embodied on different physical or tangible computer readable media, such as memory 1006 or persistent storage 1008.

Program code 1018 is located in a functional form on computer readable media 1020 that is selectively removable and may be loaded onto or transferred to data processing system 1000 for processing by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000. In these illustrative examples, computer readable storage media 1024 is a non-transitory computer readable storage medium.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communication links, such as wireless communication links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

In these illustrative examples, program code 1018 may be program code for managing communications sent to customers. Program code 1018 may include instructions which, when executed by processor unit 1004, manage the communications. For example, program code 1018 may include functions for calculating a probability of success of sending the communications. In other examples, results from sending communications to customers may be stored in memory 1006 and/or persistent storage 1008. Program code 1018 may include instructions for analyzing the results. Based on the analysis, data processing system 1000 may provide recommendations for managing the communications.

The different components illustrated for data processing system 1000 are not meant to provide architectural limitations to the manner in which different embodiments may be implemented. The different illustrative embodiments may be implemented in a data processing system including components in addition to, or in place of, those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

As another example, a storage device in data processing system 1000 is any hardware apparatus that may store data. Memory 1006, persistent storage 1008, and computer readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006, or a cache, such as found in an interface and memory controller hub that may be present in communications fabric 1002.

As another example, a storage device in data processing system 1000 is any hardware apparatus that may store data. Memory 1006, persistent storage 1008, and computer readable media 1020 are examples of storage devices in a tangible form.

In these illustrative examples, for example, server 211 of FIG. 2 can comprise multiple computer servers in mobile communication system 100 implementing components 210, 211, 212, 213, 214, 215, 216, 217, 218, and 223. These computers servers 211 can comprise a data processing system as depicted in FIG. 10. Similarly, as depicted, client 225, media environment 239, or media source 241 can comprise a plurality of data processing system 1000.

Referring to FIG. 2, advantages of the illustrative example embodiments presented include never actually partitioning media files into portions, or chunks, on server 211. This reduces memory overhead, because it is not necessary to maintain both the unmodified file and the partitioned file in memory; effectively halving the memory storage required. An added advantage is that when client 225 becomes aware of the modification not requiring pre-partitioning, client 225 can request media portion 219 on any boundary and of any reasonable length, which is useful when client 225 performs fast forward or reverse play of the respective encoded media file 217. Client 225 possesses more flexibility in how to present the media and the granularity of the controls on client 225.

In addition, when the communication link between client 225 and server 211 exhibits exceptional quality, client 225 can increase requested portion 219, size in portion request 227 to minimize protocol chatter, reduce latency, and consume less bandwidth. When network problems arise, client 225 can choose to reduce requested portion 219 size to minimize retransmissions in the event of packet failure.

Choosing not to pre-partition encoded media file 217 into chunks also improves other facilities in a data network, such as byte and object caching and the need to preprocess media. Pre-partitioning media files into chunks creates artificial string interruptions in a byte cache that limit the length of string matches, diminishing the media file's compressibility. Similarly, for an object cache many file names are replaced by one file names.

Another realized advantage for not pre-partitioning encoded media file 217 on server 211 is that the file requires no preprocessing, so an encoded media file 217 can be retrieved from anywhere on demand without using a local copy. Not pre-processing the media file into chunks means that media can be retrieved from any location. The client simply creates list of portions 229, with enriched file names, on-the-fly for any encoded media file 217 designating portions to generate and retrieve. Therefore, client 225 does not require pre-fetching the file so it can be partitioned and the appropriate playlist created, leaving the server 211 with no requirement to perform file management duties.

Instead of dividing a media file into chunks, client 225 creates a dynamic list of portions where the file names are encoded messages describing how to retrieve portion 219 from encoded media file 217 available on server 211. If "moviex" names a media file in its entirety, client 225 creates list of portions 229 for moviex such that the names for the portions, or "chunks," describe how to derive each chunk from moviex alone. The "chunk" name contains "moviex" plus a sequentially increasing sequence number plus the starting and ending location in "moviex" for the respective chunks, the first chunk name being "moviex,0001,XXXX,YYYY", where XXXX is the starting location in moviex for chunk 1 and YYYY is the ending location.

Server 211 can use an added processor module to process "chunk requests." When a request for a media file is received, such as for "moviex,0001,XXXX, YYYY", the processor operates to retrieve as a result the bytes in moviex beginning at XXXX and ending at YYYY. Server 211 never actually partitions media 216 or encoded media file 217, but client 225 now functions to create a list of portions 229 requesting identified portion 219 while server 211, and any other servers managing communication with client 225, remain stateless. Instead, client 225 becomes statefull, tracking the communication between the client 225 and any servers managing communication.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing audio visual media, the method comprising:

receiving, by a processor unit of a client device, a command to play a selected audio visual media on the client device;

determining, by the processor unit, portions of audio visual media from the selected audio visual media using a predefined list of portions maintained on the client device and a sequence identifying each portion in a particular order for playing the portions in the predefined list of portions, wherein the portions and the sequence are determined according to a selected policy from a set of policies enabling the client device to request portions on-the-fly from a server, in response to adapting to changes detected by the client during a communication session for playing each portion on the client device, wherein a list generator module of the client device uses information from sources comprising metadata, the set of policies, preferences, rules, and metrics from a performance monitor and a communication environment monitor to generate the list of portions and a play sequence;

retrieving, by the processor unit, the portions to play in sequence determined wherein the processor unit, further storing a one or more portions in a set of memory buffers based on a digital rights management requirement allowing the one or more portions of the audio video media to be stored; and playing, by the processor unit, at least a partially retrieved first portion of the portions of the selected audio visual media on the client device, wherein the first portion is identified based on the particular order in the sequence determined.

2. The method of claim 1, wherein retrieving, by the processor unit, the portions to play in the sequence determined comprises retrieving the portions based on the selected policy from a set of policies; and wherein the selected policy includes rules for retrieving the portions using a stateless streaming protocol.

3. The method of claim 2, wherein the selected policy further includes a rule for determining a size of the portions and whether the portions can be retrieved concurrently, and wherein retrieving, by the processor unit, the portions to play in the sequence determined further comprises:

identifying a subsequent portion in the sequence after the first portion, that has not been retrieved, wherein the subsequent portion is identified according to the particular order for playing the portions;

transmitting a request to a server for the subsequent portion, wherein the request is made using a stateless streaming protocol;

receiving the subsequent portion in a response from the server and storing the subsequent portion in a buffer in a memory for use by the processor unit; and wherein responsive to the selected policy allowing the portions to be retrieved concurrently, performing the identifying, transmitting, and receiving concurrently for two or more portions of the plurality of portions.

4. The method of claim 2, wherein the selected policy further includes a rule for determining a size for each portion of the portions based on a set of information retrieved from a performance monitor and wherein determining, by the processor unit, the portions of audio visual media from the selected audio visual media further comprises determining a length for each portion of the portions using the rule for determining the size of each portion of the portions and the set of information retrieved from the performance monitor.

5. The method of claim 4, wherein the set of information retrieved from the performance monitor includes at least one of a network signal strength, an encoding standard, a length of a portion of the portions, an available network bandwidth, a bandwidth usage limit, an amount of memory storage available, a location of the client device, and a direction of travel of the client device.

6. The method of claim 1, wherein the selected policy is based on a digital rights management requirement for a particular media file comprising at least one of limiting an amount of data that can be downloaded by the client device, limiting the amount of data that can be stored by the client device, limiting a number of times a portion can be played by the client device, and limiting which portions of the audio video media can be played by the client device.

7. The method of claim 1, wherein the particular order for playing the portions of the audio visual media is selected based on the command matching one of a set of commands including:

a fast reverse command, wherein the particular order includes a begin location for the first portion sequentially following a begin location for a second portion, and the first and second portion are non-contiguous;

a fast forward command, wherein the particular order includes the begin location for the first portion sequentially preceding the begin location for the second portion, and the first and second portion are non-contiguous; and a reverse command, wherein the particular order includes the begin location for the first portion sequentially following the begin location for the second portion, and the first and second portion are contiguous.

8. The method of claim 1 further comprising:

generating, by the processor unit, a request for a portion of live streaming media, wherein a length of a final portion of the portions that is last in the particular order for playing the portions of the selected audio visual media is determined based on a begin location for the final portion and a predetermined indication of an end location for the final portion; and receiving, by the processor unit, an identifier for an end of the live streaming media.

9. The method of claim 1, wherein the determining step further comprises:

generating, by the processor unit, the sequence identifying each portion of the portions in the particular order for playing the portions based on a set of received metadata about the audio video media, wherein identifying each portion includes identifying for each portion of the portions of the audio visual media a name for each portion based on the name of the audio visual media and a counter, a begin location for each portion, and an end location for each portion.

10. The method of claim 1, wherein the retrieving step further comprises:

transmitting, by the processor unit, a request to a server for the first portion of the portions of the audio visual media; and receiving, by the processor unit, the first portion of the portions of the audio visual media in a response from the server and storing the first portion of the portions in a buffer in a memory for playing, by the processor unit, the first portion on the client device.

11. A computer program product for managing a media file, the computer program product comprising:

a non-transitory computer readable storage medium;

program code, stored on the non-transitory computer readable storage medium, for receiving a command to play a selected audio visual media on a client device;

program code, stored on the non-transitory computer readable storage medium, for determining portions of audio visual media from the selected audio visual media using a predefined list of portions maintained on the client device and a sequence identifying each portion of the portions in a particular order for playing the portions in the predefined list of portions, wherein the portions and the sequence are determined according to a selected policy from a set of policies enabling the client device to request portions on-the-fly from a server, in response to adapting to changes detected by the client during a communication session for playing each portion on the client device, wherein a list generator module of the client device uses information from sources comprising metadata, the set of policies, preferences, rules, and metrics from a performance monitor and a communication environment monitor to generate the list of portions and a play sequence;

program code, stored on the non-transitory computer readable storage medium, for retrieving the portions to play in the sequence determined, further storing a one or more portions in a set of memory buffers based on a digital rights management requirement allowing the one or more portions of the audio video media to be stored; and program code, stored on the non-transitory computer readable storage medium, for playing at least a partially retrieved first portion of the portions of the selected audio visual media on the client device, wherein the first portion is identified based on the particular order in the sequence determined.

12. The computer program product of claim 11 further comprising:

wherein the program code for retrieving the portions to play in the sequence determined comprises program code for retrieving the portions based on the selected policy; and wherein the selected policy includes rules using a stateless streaming; and further comprising a rule for determining a size of the portions and whether the portions can be retrieved concurrently;

wherein program code for retrieving the portions to play in sequence further comprises:

program code, stored on the non-transitory computer readable storage medium, for identifying a subsequent portion in the sequence after the first portion that has not been retrieved, wherein the subsequent portion is identified according to the particular order for playing the portions;

program code, stored on the non-transitory computer readable storage medium, for transmitting a request to a server for the subsequent portion comprises a portion request requesting each portion of the portions is made using a stateless streaming protocol; and program code, stored on the non-transitory computer readable storage medium, for receiving the subsequent portion in response from the server and storing the subsequent portion in a buffer in a memory for use;

wherein responsive to the selected policy allowing the portions to be retrieved concurrently, performing the identifying, transmitting, and receiving concurrently for two or more portions of the portions.

13. The computer program product of claim 12 further comprising program code, stored on the non-transitory computer readable storage medium, wherein the selected policy further includes a rule for determining a size for each portion of the portions based on a set of information retrieved from a performance monitor, and wherein determining the portions of audio visual media from the selected audio visual media further comprises determining a length for each portion of the portions using the rule for determining the size of each portion of the portions and the set of information retrieved from the performance monitor.

14. The computer program product of claim 11 further comprising:

program code, stored on the non-transitory computer readable storage medium, for generating a request for a portion of live streaming media, wherein a length of a final portion of the portions that is last in the particular order for playing the portions of the selected audio visual media is determined based on a begin location for the final portion and a predetermined indication of an end location for the final portion; and program code, stored on the non-transitory computer readable storage medium, for receiving an identifier for an end of the live streaming media.

15. The computer program product of claim 11 further comprising:

program code, stored on the non-transitory computer readable storage medium, for generating the sequence identifying each portion of the portions in the particular order for playing the portions based on a set of received metadata about the audio video media, wherein identifying each portion includes identifying for each portion of the portions of the audio visual media a name for each portion based on the name of the audio visual media and a counter, a begin location for each portion, and an end location for each portion;

program code, stored on the non-transitory computer readable storage medium, for transmitting a request to a server for the first portion of the portions of the audio visual media; and program code, stored on the non-transitory computer readable storage medium, for receiving the first portion of the portions of the audio visual media in a response from the server and storing the first portion of the portions in a buffer in a memory for playing the first portion on the client device.

16. A data processing system for streaming media files, the system comprising:

a bus system;

a storage device connected to the bus system, wherein the storage device includes program code;

a processor unit configured to execute the program code to receive a command to play a selected audio visual media on a client device; determine portions of audio visual media from the selected audio visual media using a predefined list of portions maintained on the client device and a sequence identifying each portion of the portions in a particular order for playing the portions, in the predefined list of portions, wherein the portions and the sequence are determined according to a selected policy from a set of policies enabling the client device to request portions on-the-fly from a server, in response to adapting to changes detected by the client during a communication session for playing each portion on the client device, wherein a list generator module of the client device uses information from sources comprising metadata, the set of policies, preferences, rules, and metrics from a performance monitor and a communication environment monitor to generate the list of portions and a play sequence; retrieve the portions to play in sequence determined, further storing a one or more portions in a set of memory buffers based on a digital rights management requirement allowing the one or more portions of the audio video media to be stored; and play at least a partially retrieved first portion of the portions of the selected audio visual media on the client device, wherein the first portion is identified based on the particular order in the sequence determined.

17. The data processing system of claim 16, wherein in executing the program code to stream media files, the selected policy further includes a rule for determining a size for each portion of the portions based on a set of information retrieved from a performance monitor and wherein determining, by the processor unit, the portions of audio visual media from the selected audio visual media further comprises determining a length for each portion of the portions using the rule for determining the size of each portion of the portions and the set of information retrieved from the performance monitor.

18. The data processing system of claim 16, wherein in executing the program code to stream media files, the processor unit is further configured to play the particular order for playing the portions of the audio visual media based on the command matching one of a set of commands including:
- a fast reverse command, wherein the particular order includes a begin location for the first portion sequentially following a begin location for a second portion, and the first and second portion are non-contiguous;
- a fast forward command, wherein the particular order includes the begin location for the first portion sequentially preceding the begin location for the second portion, and the first and second portion are non-contiguous; and
- a reverse command, wherein the particular order includes the begin location for the first portion sequentially following the begin location for the second portion, and the first and second portion are contiguous.

19. The data processing system of claim 16, wherein in executing the program code to stream media files, the processor unit is further configured to generate the sequence identifying each portion of the portions in the particular order for playing the portions based on a set of received metadata about the audio video media, wherein identifying each portion includes identifying for each portion of the portions of the audio visual media a name for each portion based on the name of the audio visual media and a counter, a begin location for each portion, and an end location for each portion; transmit a request to a server for the first portion of the portions of the audio visual media; and receive the first portion of the portions of the audio visual media in a response from the server and storing the first portion of the portions in a buffer in a memory for playing the first portion on the client device; and further the processor unit is configured to generate the request for a portion of live streaming media, wherein a length of a final portion of the portions that is last in the particular order for playing the portions of the selected audio visual media is determined based on the begin location for the final portion and a predetermined indication of the end location for the final portion; and receive an identifier for an end of the live streaming media.

\* \* \* \* \*